Dec. 24, 1963    M. A. KARPELES    3,115,634
INSTRUMENT LANDING SYSTEM
Filed June 30, 1959    6 Sheets-Sheet 1

INVENTOR.
MARK A. KARPELES
BY
ATTORNEY

United States Patent Office 3,115,634
Patented Dec. 24, 1963

3,115,634
INSTRUMENT LANDING SYSTEM
Mark A. Karpeles, West Orange, N.J., assignor to International Telephone and Telegraph Corporation, Nutley, N.J., a corporation of Maryland
Filed June 30, 1959, Ser. No. 824,013
8 Claims. (Cl. 343—108)

This invention relates to instrument landing systems employing localizer and glide slope beacons with airborne equipment responsive thereto producing signals for guiding a craft to a landing. More particularly this invention relates to localizer and glide slope beacons emitting signals which are compatible with current TACAN airborne equipment, especially modified to obtain from these signals localizer and glide slope information.

Heretofore instrument landing systems have been employed which consist of localizer and glide slope beacons radiating beams at different carrier frequencies. Airborne equipment has consisted of different receivers tuned to each carrier frequency for detecting each beacon signal and computer devices for computing aircraft deviation from the localizer and glide slope beams. Such prior systems obviously require two receivers, one responsive to localizer carrier frequency and the other responsive to glide slope carrier frequency. They also require two computing devices, one for computing deviation from localizer beam and the other for computing deviation from the glide slope beam, and, as generally employed, this airborne equipment is employed only during instrument landing. Another limitation of prior instrument landing systems is that the glide slope beam defines only one glide slope and the computer device in the aircraft produces a signal representative of deviations of the aircraft from that one glide slope. Furthermore, changes in ground reflectivity and ground reflection level will alter the glide slope beam thus created. This limitation to a single glide slope, subject to undesirable alterations due to changes in ground reflectivity and reflection level, imposes numerous difficulties particularly when employed by craft which must approach and land at widely different velocities.

Many currently operational aircraft employ TACAN airborne equipment for enroute guidance. This TACAN airborne equipment and associated ground beacon equipment is described in De Faymoreau patent, No. 2,815,507, filed Nov. 9, 1955, and also in the March 1956 edition of "Electrical Communication." Heretofore, the TACAN airborne equipment has been employed for enroute aircraft guidance and has not been employed in conjunction with an instrument landing system. An instrument landing system combined with the TACAN airborne equipment has some obvious advantages. First, the TACAN equipment operates at 1,000 mc. carrier frequency, thus permitting a considerable reduction in the size of the localizer and glide slope antenna arrays compared to a current ILS system operating at 330 megacycles. A reduction in the size of the localizer array of about 10:1 can be achieved and the reduction in the size of the glide slope array of about 3:1 can be achieved. Furthermore, the use of directive radiating elements in the arrays is more practical at 1,000 mc. than at 330 mc. permitting a reduction in transmitter power requirements and allowing for a smaller, more compact and mobile ground unit.

An obvious saving in required airborne equipment could be gained if the TACAN airborne receiver and associated computing circuits currently employed for enroute guidance, could also be employed to produce localizer and glide slope information for energizing standard localizer and glide slope indicators in many current aircraft. The advantages gained would extend from a reduction in the amount of required airborne equipment onboard a typical aircraft employing a TACAN in the regular manner, to a considerable reduction in the power and size ILS localizer and glide slope beacon equipment.

Therefore it is a principal object of this invention to provide an improved instrument landing system, particularly one eliminating some or all of the mentioned limitations of prior instrument landing systems.

It is another object to provide such an improved instrument landing system compatible with current TACAN airborne equipment.

It is another object to provide means for modifying current TACAN airborne equipment whereby said equipment may receive special localizer and glide slope beacon signals and energize localizer and glide slope indicators.

It is another object to modify airborne TACAN equipment to energize localizer and glide slope indicators and localizer and glide slope flag alarms for an instrument landing without interfering with the operation of TACAN airborne equipment when providing enroute guidance.

It is a feature of this invention to provide a localizer beacon radiating adjacent lobes of a modulated carrier frequency, said lobes being modulated in opposite phase, a glide slope beacon radiating modulated carrier frequency, said guide slope beacon modulation varying in phase with glide slope angle, means for generating a reference signal and airborne receiver equipment responsive to said localizer and glide slope beacon radiation and said reference signal with comparison means coupled thereto for alternately phase comparing said reference signal with localizer beacon modulation and glide slope beacon modulation producing signals for energizing localizer and glide slope indicators.

It is another feature to provide means for alternately code pulsing radiation from each of said beacons so that only one beacon is code pulsed at a time and to employ pulse decoding means coupled to said airborne receiver with means coupled to said decoding means for detecting localizer and glide slope beacon modulations and phase comparing means coupled to said modulation detectors and responsive to said reference signal for energizing localizer and glide slope indicators.

It is another feature to provide means for alternately code pulsing radiation from each of said beacons so that radiation from only one beacon is code pulsed at a time, the repetition rate of said code pulses being regularly altered in one manner at said modulating frequency rate and regularly altered in another manner each time radiation from the given one of said beacons is code pulsed, said first manner of code pulse alterations representing the mentioned reference signal and said second manner of code pulse alterations serving to initiate switching means coupled to the airborne equipment for alternately feeding the output of said equipment to the localizer and glide slope indicators.

It is another feature of this invention to employ TACAN airborne equipment such as described in the reference De Faymoreau patent with certain modifications thereto such as already described in the features of this invention, whereby the output of said TACAN airborne equipment is rendered suitable for energizing localizer and glide slope indicators.

Other features and objects of this invention will be more apparent from the following specific description taken in conjunction with the drawings, in which.

Figure 1:
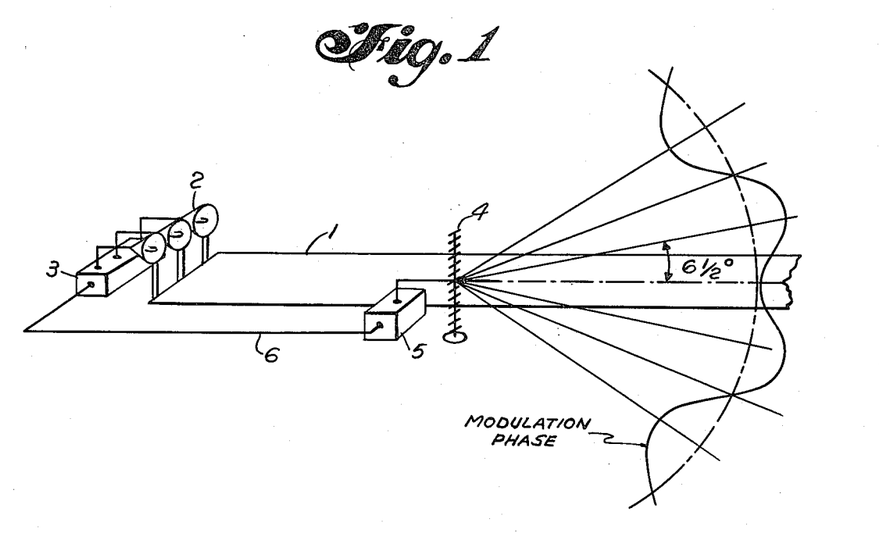
FIG. 1 is a pictorial view of localizer and glide slope beacons disposed in relation to an aircraft runway, the localizer consisting of three driven radiating elements and the glide slope antenna consisting of eleven driven elements.

Turning first to FIG. 1, there is shown an aircraft landing strip 1 having the three horn localizer array 2 disposed at one end, each of the horns of this array being fed via transmission lines from localizer ground equipment 3. The eleven element glide slope array 4 is shown disposed to one side of the runway and coupled via a transmission line to the glide slope ground equipment 5. The localizer and glide slope ground equipment denoted 3 and 5 respectively are electrically coupled via line 6 to synchronize the alternate code pulsing imposed on radiation from the two arrays.

Figure 2:
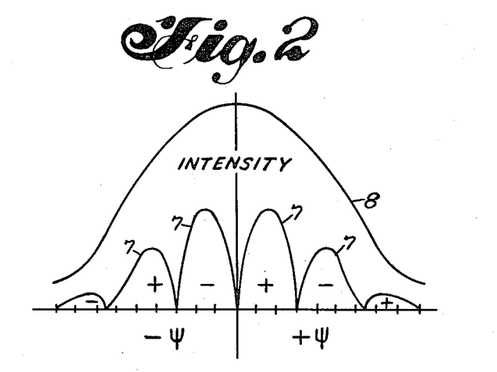
FIG. 2 depicts the radiation pattern of the three horn localizer array.

Turning next to FIG. 2 there is shown the radiation pattern of the three-horn localizer array, a function of radiation intensity versus azimuth angle $\psi$. Line 7 represents the intensity of the sideband radiation at various azimuth angles and line 8 represents the intensity of carrier radiation at various azimuth angles. Note that line 7 forms loops, each of which is denoted plus or minus to represent the phase of modulation. At an azimuth angle of zero degrees, the sideband radiation intensity is zero but increases rapidly as the absolute value of the azimuth angle deviates from zero. In the embodiment of this invention described herein the three-horn localizer array is energized by localizer ground equipment in such a manner that the sideband pattern 7 only is modulated at a given modulation frequency and the carrier pattern 8 is not modulated at said given modulation frequency. Actually the pattern 7 represents the lobes or side lobes of the localizer antenna array in space. The two side horns of the three-horn array are provided with 135 cycle modulation. One horn is provided with 135 cycle modulation of a first phase, and the other side horn is provided with 135 cycle modulation of the opposite phase. The side lobes are created in space (as shown in FIG. 2 item 7), the side lobe on one side of the center line representing modulation of a first phase and the side lobe on the other side of the antenna center line representing modulation of the opposite phase. The so-called carrier pattern 8 at 150 c.p.s., is sent only from the center horn of the antenna and hence, it has the same phase of modulation and the same type of modulation on either side of the center line of the antenna. Consequently, when sideband radiation is detected in the output of receiver equipment and demodulated, said given modulating frequency will appear when the receiver equipment is at an absolute azimuth angle greater than zero but less than the angles at which the other null points of curve 7 occur. Consequently, if the given modulation frequency is detected in the sideband pattern and phase compared with a reference signal, an indication of which side of zero degrees azimuth the receiver equipment is located will be obtained.

One method for creating a radiation pattern defining glide slope paths unaltered by changes in ground level and reflectivity is to impose a characteristic on the radiation which varies with elevation angle and is the same at equal positive and negative angles. Consequently, signals which reflect from the ground will not alter that characteristic upon combining with the directly radiated signals which do not reflect from the ground. If the characteristics imposed on the radiation by which elevation angles are to be defined is a modulation, and the phase of this modulation is to be representative of elevation angle, then the phase of modulation must vary with the absolute value of the elevation angle. When ground reflectivity varies in such a system, the modulation phase of the signal of any particular elevation angle which is contributed by reflection from the ground will be the same as the modulation phase of the directly radiated signal along that same elevation angle. Consequently, ground reflections will only alter the amplitude of radio frequency signals received by an aircraft, but they will not alter the information as represented by the modulation phase of the received signals.

Figure 3:
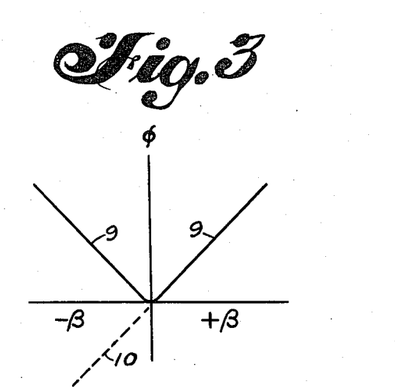
FIG. 3 is a plot of glide slope carrier modulation phase versus positive and negative elevation angles.

Turning first to FIG. 3 there is shown a plot 9 of modulation phase $\phi$ versus elevation angle $\beta$ describing the preferred characteristics of the glide slope radiation pattern. The radiation is from a source, preferably near the ground, for guiding an aircraft to an instrument landing. As can be seen from FIG. 3, curve 9 is essentially linear with absolute value of the elevation angle $\beta$. For example, each value of modulation phase $\phi$ is the same for the same value of $\beta$ whether positive or negative. Consequently, an expression for the modulation phase $\phi$ in terms of the elevation angle $\beta$ must be unaltered by a change in the sign of $\beta$ and modulation phase will be the same at equal elevation and deflection angles. In some prior systems in which modulation phase varies with elevation angle, that variation is continuous as shown by a dotted line 10 extending from one side of curve 9 and such prior systems do not produce equal modulation phases at equal elevation and deflection angles.

Figure 4:
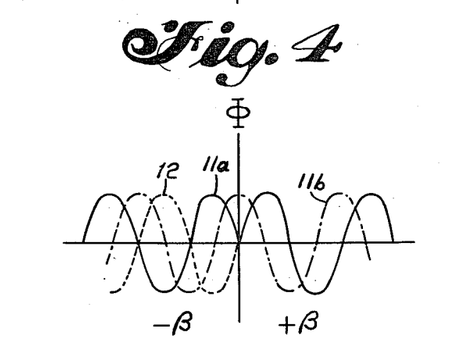
FIG. 4 is a plot of components of radiated glide slope signal versus positive and negative elevation angles for distinguishing features of the present invention from prior systems.
Figure 5:
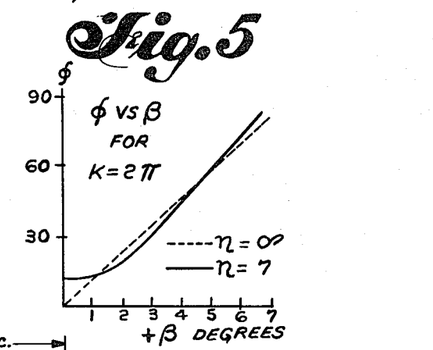
FIG. 5 is a plot of glide slope carrier modulation phase versus positive elevation angles for an ideal array of the type described in this invention having an infinite number of pairs of radiating elements and for the eleven element array described with relation to one embodiment of this invention.

FIG. 4 shows plots of modulated carrier signal amplitude $\Phi$ versus elevation angles for comparing the preferred characteristics for this invention represented by curves 11a and 11b which, as can be seen, are symmetrical about $\Phi$, with some prior systems represented by dash line 12. Line 12 extends as a sinewave from one side of curve 11a just as line 10 extends from one side of curve 9. As can be seen, line 12 is not symmetrical about $\Phi$.

In order to produce a pattern in which modulation phase varies essentially, as shown in curve 9 in FIG. 3, it is desirable that the modulated carrier signal $\Phi$ be expressed in terms of modulating rate $W_m$, carrier frequency rate $W_c$ and elevation angle $\beta$ as shown in Equation 1.

$$\Phi = [1 + A \sin (W_m t + 2K\beta + \Delta)] \sin W_c t \quad (1)$$

In Equation 1, A is an amplitude term that remains constant, K is a constant of proportionality relating elevation angle $\beta$ to modulation phase and $\Delta$ is a constant angle representing a given phase shift. Since the modulated carrier signal $\Phi$ expressed in Equation 1 must remain unaltered when the sign of $\beta$ changes, the term in Equation 1 containing $\beta$ is expanded as follows:

$$A \sin (W_m t + 2K\beta + \Delta) = A \sin (W_m t + \Delta) \cos 2K\beta \\ + A \cos (W_m t + \Delta) \sin 2K\beta \quad (2)$$

Now $\cos 2K\beta$ equals $\cos -2K\beta$; consequently the first terms in the right side of Equation 2 is the same whether $\beta$ is negative or positive and is therefore an even function. The second term in the right side of Equation 2 can be made an even function when appropriate signs are used and, therefore, it can be analyzed into a Fourier cosine series, denoted $F(K\beta)$, which satisfies the following conditions:

$$F(K\beta) = \sin 2K\beta \qquad (3)$$
when $K\beta > 0$ $$F(K\beta) = 0 \qquad (4)$$
when $K = 0$ $$F(K\beta) = -\sin 2K\beta \qquad (5)$$
when $K\beta < 0$ Such a Fourier series, $F(K\beta)$, is as follows:

$$F(K\beta) = \sum_{n=0}^{\infty} a_n \cos nK\beta \qquad (6)$$

For this series the general coefficient, $a_n$, is as follows:

$$a_n = \frac{2}{\pi} \int_0^\pi F(K\beta) \cdot \cos nK\beta \cdot d(K\beta) \qquad (7)$$

consequently $$a_n = \frac{2}{\pi} \int_0^\pi \sin 2K\beta \cdot \cos nK\beta \cdot d(K\beta) \qquad (8)$$

$$a_n = \frac{-1}{\pi} \left[ \frac{\cos(2-n)\pi - 1}{2-n} + \frac{\cos(2+n)\pi - 1}{2+n} \right] \qquad (8a)$$

It is evident from Equation 8a that $a_0$ is zero and that $a_n$ is zero for all even valves of $n$. Therefore, solving for odd valves of $n$, the following are obtained;

$$a_1 = \frac{8}{3\pi}, \ a_3 = \frac{-8}{5\pi}, \ a_5 = \frac{-8}{21\pi}, \ a_7 = \frac{-8}{45\pi}, \ a_n = \frac{8}{\pi(4-n^2)} \qquad (9)$$

and so forth to $n = \infty$.

The radiation pattern of Equation 1 has now been analyzed to the following form:

$$\Phi = \left[ 1 + A \sin(W_m t + \Delta) \cos 2K\beta + A \cos(W_m t + \Delta) \sum_n^\infty a_n \cos nK\beta \right] \sin W_c t \qquad (10)$$

where $a_n$ has values as shown in Equation 9.

It can be approximated at small values of $\beta$, that sin $\beta = \beta$. With this substitution, Equation 10 becomes $$\Phi = \left[ 1 + A \sin(W_m t + \Delta) \cos(2K \sin \beta) + A \cos(W_m t + \Delta) \sum_{n=0}^{n=\infty} a_n \cos(nK \sin \beta) \right] \sin W_c t \qquad (11)$$

Equation 11 can be expanded to include any number of values of $n$. Since this series converges rapidly a practical value of $n$ up to and including $n=7$ is chosen. When expanded, and the values for $a_n$ shown in Equations 9 are inserted, Equation 11 becomes as follows:

$$\Phi = \sin W_c t$$
$$+ A \sin(W_m + \Delta) [\cos(2K \sin \beta) \sin W_c t]$$
$$+ A \cos(W_m + \Delta) \frac{8}{3\pi} [\cos(K \sin \beta) \sin W_c t]$$
$$- A \cos(W_m + \Delta) \frac{8}{5\pi} [\cos(3K \sin \beta) \sin W_c t]$$
$$- A \cos(W_m + \Delta) \frac{8}{21\pi} [\cos(5K \sin \beta) \sin W_c t]$$
$$- A \cos(W_m + \Delta) \frac{8}{45\pi} [\cos(7K \sin \beta) \sin W_c t]$$
$$(12)$$

Employing the trigonometric identity sin $x$ cos $y$ equals ½ sin $(x+y)$ + ½ sin $(x-y)$, Equation 12 becomes as follows:

$$\Phi = \sin W_c t \qquad (13a)$$
$$+ A/2 \sin(W_m + \Delta) [\sin(W_c t + 2K \sin \beta)$$
$$+ \sin(W_c t - 2K \sin \beta)] \qquad (13b)$$
$$+ \frac{4A}{3\pi} \cos(W_m + \Delta) [\sin(W_c t + K \sin \beta)$$
$$+ \sin(W_c t - K \sin \beta)] \qquad (13c)$$
$$- \frac{4A}{5\pi} \cos(W_m + \Delta) [\sin(W_c t + 3K \sin \beta)$$
$$+ \sin(W_c t - 3K \sin \beta)] \qquad (13d)$$
$$- \frac{4A}{21\pi} \cos(W_m + \Delta) [\sin(W_c t + 5K \sin \beta)$$
$$+ \sin(W_c t - 5K \sin \beta)] \qquad (13e)$$
$$- \frac{4A}{45\pi} \cos(W_m + \Delta) [\sin(W_c t + 7K \sin \beta)$$
$$+ \sin(W_c t - 7K \sin \beta)] \qquad (13f)$$

Figure 6A:
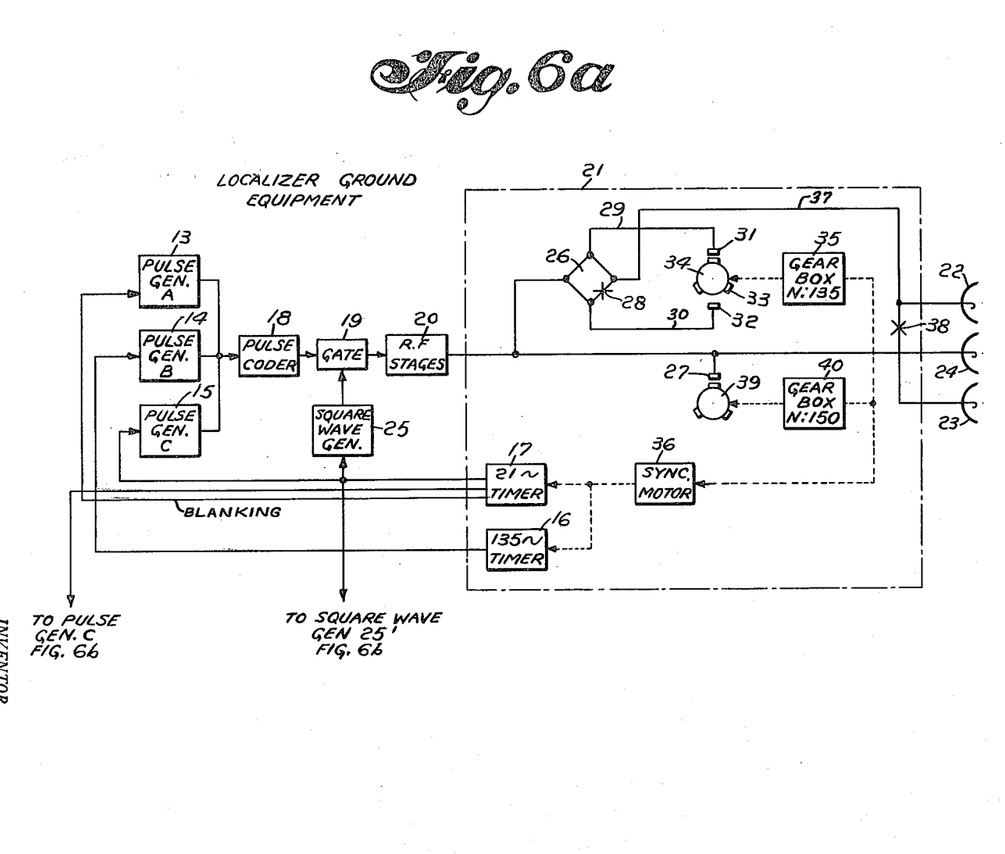
FIGS. 6a and 6b are block diagrams and schematics of the ground equipment for energizing the three-horn localizer array and the ground equipment for energizing the eleven element glide slope array.
Figure 10:
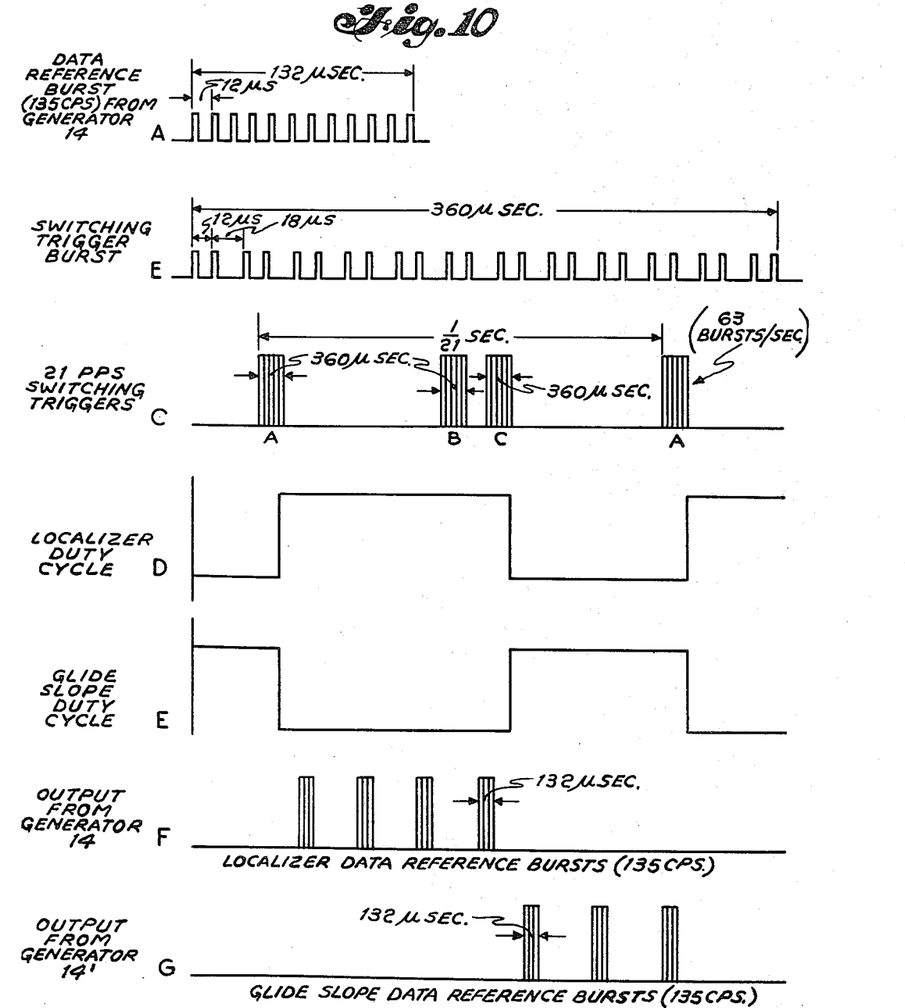
FIGURE 10 is a timing diagram showing the pulse coding used in the system and showing the relative timing of the various pulses.

Turning next to FIG. 6a there is shown a localizer ground equipment for energizing the three-horn localizer array. This equipment consists of pulse generators A, B and C denoted 13, 14 and 15. Since this system is to be compatible with current TACAN airborne equipment pulse generator 13 preferably generates pulses at a rate of 2,500 c.p.s., pulse generator 14 produces a burst of about six pulses 24 microseconds apart each time it is triggered by 135 cycle timer 16. Thus, the burst of pulses from generator B, item 14 is converted by pulse coder 18 into a burst of 6 "twin pulses," each twin pulse consisting of two pulses 12 microseconds apart. Then the burst from generator 14 after passing through coder 18 consists of 12 pulses, each pulse 12 microseconds apart, the whole burst of 12 pulses covering a period in time of 132 microseconds. This pulse is the data reference burst and it is illustrated in FIG. 10, the first timing diagram shown. Pulse generator 15 produces a burst of about 12 pulses, 30 microseconds between pulses each time it is triggered by 21 cycle timer 17. FIGURE 10 in the second timing diagram entitled "switching trigger burst" shows the type of pulse burst which is produced by the pulse generator C, item 15 or generator 15'. The 12 pulses from generator 15 are converted into 24 pulses in 12 groups of twin pulses, each twin pulse consisting of two pulses separated by 12 microseconds. The second pulse of a twin pulse group is separated from the first pulse of the next twin pulse group by 18 microseconds. Hence, the burst signal from generator 15 after being coded by coder 18 consists of 24 pulses distributed over a 360 microsecond period with the above time spacing. Thus, an average pulse repetition rate of 360 divided by 24 equal to 15 microseconds results between pulses. This is illustrated in detail in FIGURE 10, the second pulse train labeled "switching trigger burst." The outputs of generators 13, 14 and 15 are applied to pulse coder 18 which changes each single pulse into a pair of pulses 12 microseconds apart. The pulses from coder 18 are fed via gate 19 to RF stages 20 where they serve to modulate, or key, RF oscillations or amplifier stages. The type of pulse coding used for the two types of reference bursts described above is exactly the same type of coding which is used by the TACAN system and which is described in detail in the cited Patent 2,815,507 by De Faymoreau. The data reference burst of 6 twin pulses corresponds to FIGURE 4d and the switching trigger burst of 12 twin pulses corresponds to FIG. 4a of De Faymoreau. The RF pulses are fed from stages 20 to mechanical modulator 21 which modulates the pulsed RF at two different modulating frequencies; namely, 135 and 150 c.p.s. Sidebands of the 135 cycle modulation of opposite phases are fed from mechanical modulator 21 to the outer horn antennas 22 and 23 while the carrier modulated at 150 c.p.s. is applied to central horn 24. Pulse generators 13, 14 and 15, pulse coder 18 and RF stages 20 may be similar to items 10, 13, 17, 11 and 12, respectively, in FIG. 1 of the reference De Faymoreau patent. The purpose of 135 cycle timer 16 is to trigger pulse generator 14 to produce a burst of pulses in the output of RF stages 20 at regular intervals, 135 times a second, to serve as a reference signal. The purpose of the gate 19 is to apply pulses from coder 18 to RF stages 20 during regular intervals herein called the localizer duty cycle so that TACAN airborne equipment such as described in the reference patent is responsive to radiation from the localizer array only during said localizer duty cycle when the RF stages are pulsed. Gate 19 is controlled by the output of square wave generator 25 which is in turn triggered by the output of 21 cycle timer 17. Simultaneously therewith, 21 cycle timer 17 also triggers pulse generator 15 producing a single burst of spaced pulses. Consequently, at the initiation of the duty cycle of the localizer beacon, when gate 19 is opened, there appears a burst of pulses in the output of the RF stages 20 to announce the initiation of said duty cycle and this burst of pulses are identical to so called "north reference" burst of pulses mentioned in the reference De Faymoreau patent and in the above-mentioned publication.

One method for energizing the three horns 22, 23 and 24 in the manner mentioned above is shown in the details of mechanical modulator 21 and consists of an RF bridge 26 and a variable capacitance 27 coupled to the output of RF stages 20. Bridge 26 preferably has quarter wavelength legs, except for leg 28 which is preferably three quarter wavelength. Lines 29 and 30 are preferably one half wavelength and terminate in capacitive members 31 and 32 respectively. Capacitive members 31 and 32 form large capacitances with buttons such as button 33 on disk 34 which is rotated by sync motor 36 via gear box 35. It is a well-known principle that when a half wavelength line is coupled to a low capacitance at its one end it will reflect high impedance and when it is coupled to a large capacitance at its one end it will reflect a short. Consequently, lines 29 and 30 alternately reflects shorts to opposite terminals of RF bridge 26 when disk 34 is rotated and this alternate reflection serves to modulate RF delivered by the bridge. Since leg 28 is three quarter wavelength rather than a quarter as are the other legs of bridge 26, the carrier is suppressed in the output from the bridge and only modulated sidebands exist. The output from bridge 26 carried by line 37 is applied directly to horn 22 and is fed to horn 23 via a phase reverser 38.

Another output from RF stages 20 is coupled to capacitance 27. The carrier in this output is modulated in somewhat the same manner as the carrier is modulated in bridge 26 except that modulation frequency is 150 c.p.s. rather than 135 c.p.s. For this purpose rotating disk 39 with capacitive buttons fixed thereto and gear box 40 coupled to the output of sync motor 36 are provided. Consequently, by virtue of the described equipment forming mechanical modulator 21, horns 22 and 23 are energized by sidebands of carrier modulated by 135 c.p.s. and horn 24 is energized by carrier plus sidebands of carrier modulated by 150 c.p.s.

Figure 6B:
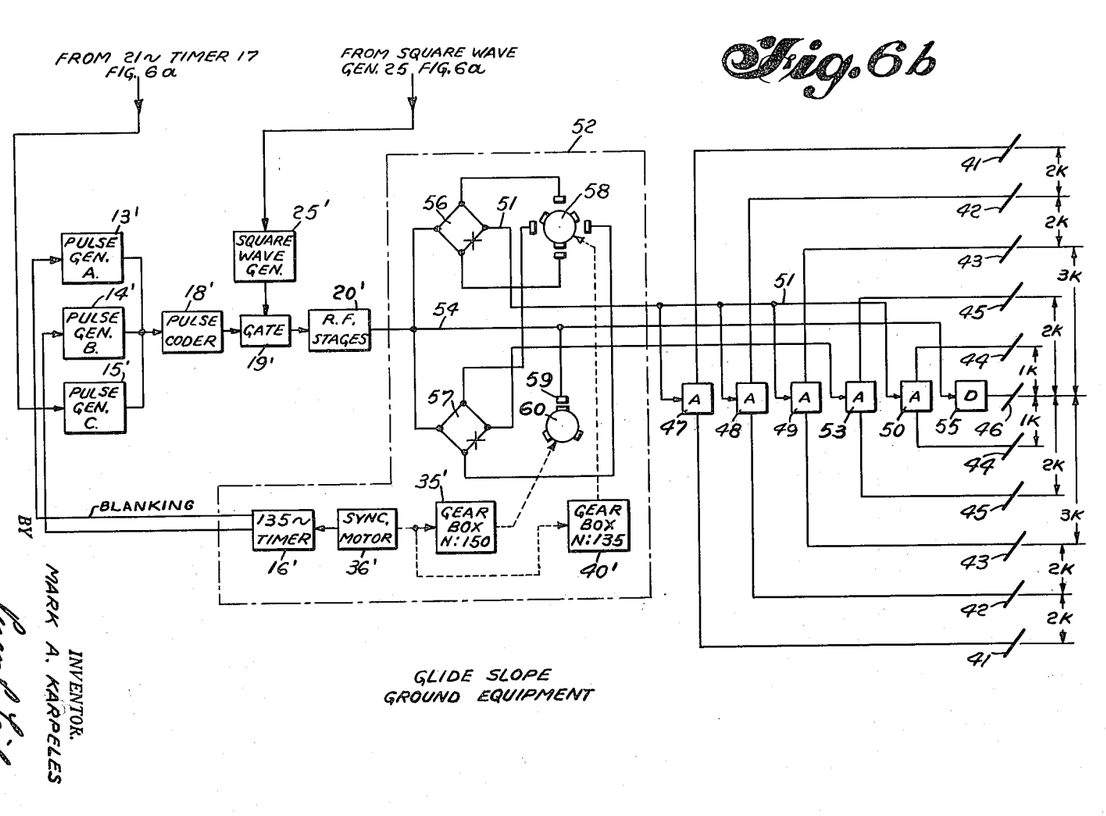

In FIG. 6b there is shown an arrangement of eleven glide slope antenna elements with means for energizing said elements to create a modulated pattern of radiation as expressed in Equation 13. It is obvious from the derivation of Equation 13 that many more terms could be included by expanding the expression to greater values of $n$. However, for the embodiment hereindescribed, the expansion will be made to $n=7$. An examination of the terms in Equation 13 which are denoted as terms 13a, 13b, 13c, 13d, 13e and 13f indicate that each of the terms except term 13a may be contributed by a different pair of antennas. It becomes further apparent that the constant K represents a unit distance of separation between the antennas in each pair. For example, term 13b could be contributed by a pair of antennas energized by a double sideband of the carrier rate $W_c$ modulated by the modulating rate $W_m$, the antennas of this pair being separated by a distance represented by the quantity 2K. By the same reasoning, terms 13c, 13d, 13e and 13f may each be contributed by a different pair of antennas, the antennas of each pair separated by distances equivalent to K, 3K, 5K and 7K, respectively, and each of these pairs of antennas being energized by double sidebands of $W_c$ modulated by $W_m$ which is in quadrature with the modulation of the signal energizing the antenna pair contributing the term 13b. The amplitude of the double sideband signals energizing each of the different pairs of antennas are represented by the amplitude factors of each of the terms 13b to 13f relative to unity amplitude of term 13a.

If each of the different antenna pairs of representing the different terms of Equation 13, as described above, are arranged vertically and symmetrically about a horizontal line and an additional antenna element is disposed in the vertical arrangement on the horizontal line, it can be assumed that the radiation from each pair of antennas emanates from the point in the array where the single element is located. Furthermore, if the single element is energized by carrier frequency to contribute the term 13a in Equation 13, the complete expression for the composite signal $\Phi$ as a function of elevation angle $\beta$ expressed by Equation 13 will be obtained.

In FIG. 6b there is shown eleven vertically disposed antenna elements arranged in five symmetrical pairs 41, 42, 43, 44 and 45 with a single antenna element 46 disposed in the same vertical arrangement on the line of symmetry between antennas of each pair. Antenna pairs 41, 42, 43 and 44 are coupled via attenuators 47, 48, 49 and 50 to line 51 which is energized by one output from mechanical modulator 52. While antenna pair 45 is coupled via attenuator 53 to output of modulator 52. The central element 46 is coupled to output line 54 of RF stages 20′ by a suitable delay circuit 55. The purpose of delay circuit 55 is to insure that the phase of carrier signal energizing element 46 is the same as the phase of carrier signal energizing antenna pairs 44 and 45. The transmission lines coupling line 51 through attenuators to antenna pairs 41, 42 and 43 have the same electrical length and this electrical length is also the same in the transmission line coupling antenna pair 45 to its source. On the other hand, the transmission line coupling line 51 via attenuator 50 to antenna pair 44 has an electrical length which differs from the others by preferably one half a wavelength of carrier frequency.

The distance between the antennas of pairs 41, 42, 43 and 44 are related to each other as odd whole numbers, and the antennas of pair 45 are separated a distance twice that separating the closest spaced of the others. Consequently, if antennas of the pair which is closest to the line of symmetry are displaced a distance K from that line of symmetry, then the next closest pair must be displayed a distance 2K from the line of symmetry, the next 3K from the line of symmetry, the next 5K from the line of symmetry, the next 7K from the line of symmetry, etc. Attenuators 47 to 50 and 53 coupling energy to antenna pairs 41, 42, 43 and 44, respectively, are such that they attenuate the double sideband signals from mechanical modulator 52 in proportion to the terms $$\frac{4A}{3\pi}, \frac{4A}{5\pi}, \frac{4A}{21\pi}, \frac{4A}{45\pi}$$

$A/2$, respectively, relative to the amplitude of carrier signal energizing antenna element 46.

Mechanical modulator 52 is energized by a system very similar to that energizing mechanical modulator 21. This similar system consists of pulse generators A, B and C denoted 13' and 14' and 15', pulse coder 18', gate 19', RF stages 20' and square wave generator 25'. Each of these devices, 13' to 25' operate in exactly the same manner as devices 13 to 25 described with reference to localizer ground equipment. Consequently, no further description of the operation of devices 13' to 25' will be included herein.

Consider next the components of mechanical modulator 52. This modulator produces unmodulated carrier signal and two sets of carrier suppressed double sideband signals resulting from carrier modulated at 135 c.p.s. These sets of carrier suppressed double sideband signals result from carrier modulations in quadrature, consequently, one set of these carrier suppressed double sidebands are in quadrature with the other. For this purpose identical RF bridges 56 and 57 are provided each having three legs of a quarter wavelength and a corresponding fourth leg of three quarter wavelength. These bridges have their modulation terminals connected to half wavelength lines, each line ending in a capacitive member, capacitively coupled to buttons on disk 58 which is rotated by sync motor 36'. As described with reference to RF bridge 26, modulation terminals of bridges 56 and 57 are alternately shorted and opened as the buttons on disk 58 alternately form large capacitances with the capacitive members on the end of the lines coupled to those terminals. The lines coupled to modulation terminals of bridge 56 terminate at capacitive members orientated in quadrature with the capacitive members at the end of lines coupled to modulation terminals of bridge 57 and, consequently, the carrier modulation phase produced in the output of bridge 56 will be in quadrature with the modulation phase produced in the output of bridge 57. Furthermore, since one leg of each of these bridges is three quarter wavelengths while the other legs are one quarter wavelength, the carrier will be suppressed in the outputs of each of these bridges. The output of bridge 56 is coupled to line 51 which feeds attenuators 47, 48, 49 and 50 which in turn energize antenna pairs 41, 42, 43 and 44, respectively, while the output of bridge 57 feeds antenna pair 45 via attenuator 53. Variable capacitance 59 is coupled to line 54 which feeds antenna element 46. This capacitance is varied at 150 c.p.s. by rotating buttons on disc 60. Discs 58 and 60 are rotated by sync motor 36' via gear boxes 35' and 40', respectively. The purpose of capacitance 59 and disc 60 is to add 150 c.p.s. modulations to the carrier signal energizing the glide slope antenna array. This 150 c.p.s. modulation in no way alters the radiation pattern of 135 c.p.s. carrier modulation described above with reference to FIG. 2.

Sync motor 36' which drives mechanical modulator 52 also drives 135 cycle timer 16' in the same manner that sync motor 36 drives 135 cycle timer 16 in mechanical modulator 21. Timer 16' produces pulses for triggering pulse generator 14' which in turn produces bursts of about six pulses, 24 microseconds apart, just as item 18 in the reference De Faymoreau patent. As mentioned above with reference to localizer equipment, 21 c.p.s. timer 17 energizes square wave generators 25 and 25' which generate the localizer and glide slope duty cycles respectively. Furthermore, timer 17 triggers pulse generator 15 to emit a single burst of "north reference" code pulses. Now it should also be noted that 21 c.p.s. timer 17 triggers pulse generator 15' in the glide slope equipment so that generator 15' emits a pair of closely spaced bursts of "north reference" code pulses. The second burst of each pair serves to announce the initiation of the glide slope duty cycle.

Figure 7:
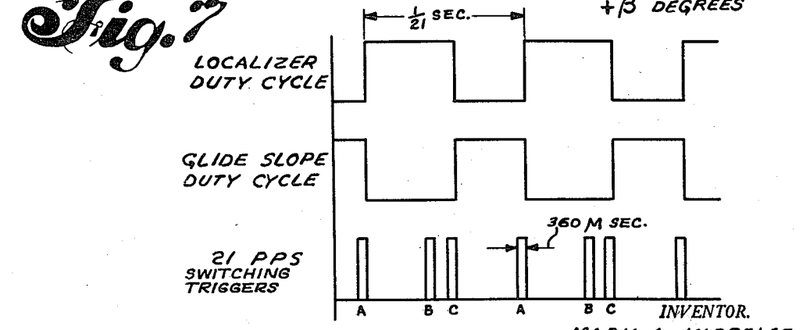
FIG. 7 depicts the duty cycles and trigger pulses associated therewith during which the localizer and glide slope beacon radiation is code pulsed.

Turning next to FIG. 7 there is shown duty cycles for the localizer and glide slope beacons. These duty cycles represent the intervals during which the beacon radiations are code pulsed. As can be seen in FIG. 7, the duty cycles of the localizer and glide slope beacons immediately follow each other and are not coincident. The positive excursions of the localizer and glide slope duty cycles are preferably of equal duration although they might be different by as much as 40 to 60%. The 21 cycle trigger pulses, represented as bursts of pulses from pulse generators 15 and 15', preferably occur simultaneously with the initiation of the localizer duty cycle and at the initiation of the glide path duty cycle. The pulses which trigger the "north reference" pulse generators 15 and 15' announce the initiation of the glide slope and localizer duty cycles. These pulses are shown as a single pulse coincident with the beginning of the localizer duty cycle and a pair of pulses, the second of which is coincident with the beginning of the glide slope duty cycle. Twenty-one cycle timer 17 which energizes square wave generators 25 and 25', which in turn generate the localizer and glide slope duty cycles, respectively, is preferably a commutator device mechanically driven by sync motor 36 producing pulses which are fed to square wave generators 25 and 25' in coincidence with the front edge of the localizer and glide slope duty cycles, respectively.

Figure 8:
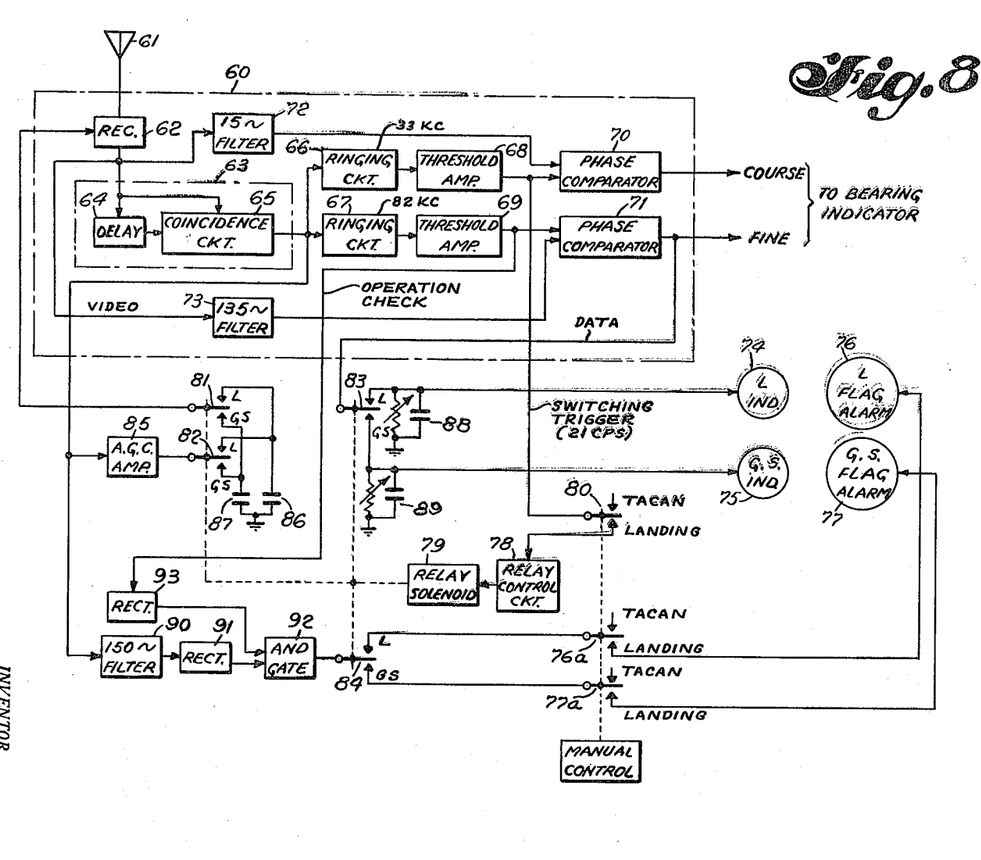
FIG. 8 depicts TACAN airborne equipment such as described in the reference De Faymoreau patent with modifications thereto, whereby such equipment may energize localizer glide slope indicators and localizer and glide slope flag alarms.

Turning next to FIG. 8 there is shown typical TACAN airborne equipment 60 which may be identical to the equipment described in the reference De Faymoreau patent in conjunction with FIG. 1 of that patent. Airborne equipment 60 might for example consist of an antenna 61, energizing receiver 62 tuned to the glide slope and localizer carrier frequency. The output from receiver 62 is decoded by decoder 63 consisting of a delay and coincidence circuit, 64 and 65, and decoded pulses from decoder 63 are applied to ringing circuits 66 and 67. Ringing circuits 66 and 67 correspond to items 28 and 29 of FIG. 1 in the reference De Faymoreau patent. Ringing circuit 66 is tuned to approximately 33 kilocycles and ringing circuit 67 is tuned to approximately 82 kilocycles. Ringing circuit 66 responds to the switching trigger burst, such as illustrated in FIGS. 7 and 10, the second curve. The value of 33 kilocycles results from $$\frac{1}{30 \text{ microseconds}}$$

which equals 33 kilocycles. This is because the spacing between twin pulses in the switching burst from generator 15 or 15' is basically 30 microseconds as illustrated in FIG. 10, the second curve. Likewise, the ringing circuit 67 which responds to the data reference burst illustrated at the top of FIG. 10 is tuned to 82 kilocycles because one divided by 12 microseconds is equal to approximately 82 kilocycles. 12 microseconds is the separation between adjacent pulses in the burst of six twin pulses produced by generators 14 or 14'. It should be pointed out that the ringing circuits and threshold amplifiers 66, 67, 68 and 69 produce a single pulse at the output of 68 or 69 for each complete burst which is detected by the ringing circuits. The actual repetition rate at which the pulse bursts are delivered to the TACAN receiver in FIG. 8 is open to wide variation. In this case circuits 66 and 68 will respond to the 21 cycle-per-second (63 bursts per second) switching repetition rate, but any other convenient frequency, for example, a repetition rate of 15 cycles per second or 25 cycles per second might have been used for the switching rate. Circuits 66 and 68 in conjunction with the decoder 63 will work equally well over a wide range of repetition frequencies. All that is necessary is that the burst itself be a burst of 12 twin pulses distributed over 360 microseconds as illustrated in FIG. 10 for the switching trigger burst. Likewise, ringing circuit 67 and threshold amplifier 69 put out one pulse for each burst of six twin pulses which are sent to the airborne equipment by either beacon on the ground from 14 or 14'. There is no necessity to use 135 cycles for the channel 63, 67, 69. Any convenient frequency could have been used to provide reference bursts to provide subdivisions for the data transmission channel. 161 cycles might have been used, for example. It is necessary, however, that the filter shown as item 73 have an actual frequency which corresponds to the repetition rate which will be used through the circuits 63, 67, 69. In this case the repetition rate is 135 bursts per second. This requires the filter 73 to respond to 135 cycles per second because filter 73 responds to the non-decoded video output from receiver 62. In other words, filter 73 responds to the envelope which has amplitude modulation at 135 c.p.s. imposed upon a continuous stream of pulses produced by the so-called random pulse generator 13 or 13'. It may also be noted that for the purposes of the present invention, the filter 72 at 15 cycles and the phase comparator 70 have no function whatsoever for the instrument landing system. They are required in normal TACAN operation and are therefore built into and are present in a normal TACAN receiver, such as 60. But for the landing instrument operation where switch 80 is thrown into the position shown as "landing," filter 72 and phase comparator 70 have no function whatsoever and they could be dispensed with all together if TACAN-type operation was not also desired in the receiver 60. The output of these ringing circuits are applied to threshold amplifiers 68 and 69 whose outputs are applied to phase comparator circuits 70 and 71, respectively. Phase comparator 70 serves to phase compare the bursts of signal from ringing circuit 66 with a 15 cycle modulation appearing in the output of receiver 62. This 15 cycle modulation is detected by a 15 cycle filter 72. In a similar manner phase comparator 71 serves to phase compare a burst of signal in the output of ringing circuit 67 with 135 cycle modulation appearing on the output of receiver 62. This 135 cycle modulation is detected by 135 cycle filter 73. The output of phase comparator circuit 70 and 71 energize coarse and fine bearing indicators just as does the system described in the reference De Faymoreau patent.

Modifications to the TACAN airborne equipment are shown in FIG. 8 as the multitude of components coupled to the airborne TACAN equipment 60. These additional components operate in conjunction with the components in equipment 60 to energize localizer and glide slope indicators 74 and 75 and to energize localizer and glide slope flag alarms 76 and 77 in response to signals from localizer and glide slope beacons such as shown in FIGS. 6a and 6b, the signals from which are received by equipment 60.

When the aircraft is approaching for a landing, antenna 61 is responsive to signals from the localizer and glide slope beacons described with reference to FIGS. 6a and 6b and ringing circuit 66 produces bursts of output in coincidence with the 21 c.p.s. trigger pulses shown in FIG. 7. This occurs because the single bursts of pulses from the localizer beacon and double bursts from the glide slope beacon, occurring at repetition rates of 21 c.p.s. are of the same nature as the "north reference" bursts of pulses described in the referenced De Faymoreau patent which energized the ringing circuit 28 in that patent. Consequently, during approach and landing the output of the threshold amplifier 68 applied to relay control circuit 78 will energize relay 79 at a repetition rate of 21 c.p.s. A manually operated switch 80 might be provided at the input to relay control circuit 78 so that the relay control circuit is responsive only during approach and landing. Relay 79 mechanically operates switches 81, 82, 83 and 84, simultaneously positioning the switches at terminals marked "L" for localizer or "GS" for glide slope. When circuit 80 energizes solenoid 79 it is preferably of a duration equal to the localizer duty cycle shown in FIG. 7.

The purpose of switches 81 and 82 is to apply the output of AGC amplifier 85 which is coupled to the output of receiver 62 to the RF stages of receiver 62 along with AGC memory signals from capacitors 86 or 87 depending on the position of the switches. For example, when switches 81 and 82 are at terminals L, localizer beacon pulses are decoded by decoder 63 and AGC amplifier 85 is energized by these decoded pulses and the output of amplifier 85 along with the charge on capacitor 86 is applied via switches 82 and 81 to receiver 62. Likewise, and in the same manner, when switches 81 and 82 are at terminals GS, glide slope beacon pulses appearing in the output of decoder 63 energize amplifier 85 whose output is combined with the charge on capacitor 87 and applied to receiver 62. Subsequently, when switches 81 and 82 are again positioned at terminals denoted L, the previous output from AGC amplifier 85 stored by condenser 86 during the previous interval when the switches were positioned at terminals L will be combined with the amplifier output and applied to the receiver. Consequently, required AGC voltage will be immediately applied to receiver 62 to provide proper gain control of pulses appearing in the output of decoder 63 as the system alternately switches from localizer to glide slope, etc.

The purpose of switch 83 is to apply the output from phase comparator 71 alternately to localizer and glide slope buffer circuits 88 and 89 which feed indicators 74 and 75, respectively. These buffer circuits might for example consit of a variable resistor and capacitance as shown, the time constants for which may be designed as required to maintain an uninterrupted D.C. signal to the respective indicators while the rheostat is used to obtain the required gain. When switch 83 is positioned at terminal L, the output of phase comparator circuit 71 compares sideband modulation phase of signal radiated by the three horn localizer antenna with the standard 135 cycle signal generated by 135 cycle timer 16 and detected by ringing circuit 67. As can be seen by reference to the localizer radiation pattern shown in FIG. 2, the sideband modulation from the three-horn localizer antenna will be positive for positive azimuth angles and it will be negative for negative azimuth angles (within a certain range of angles) and since this sideband modulation phase is represented by the output from 135 cycle filter 73, the output from phase comparator 71 will represent deviations to the left or right of zero azimuth angle and, consequently, this output may serve to energize localizer indicator 74. On the other hand, when switch 83 is positioned at terminal GS, phase comparator 71 compares the sideband modulation phase of signal radiated by the glide slope antenna with the standard 135 cycle signal represented by the output of 135 cycle timer 58 of FIG. 6b. Since the sideband modulation phase of signal from the localizer antenna varies linearly with glide slope angle, the output of phase comparator 71 will represent glide slope angle and may be applied via terminal GS of switch 83 and glide slope buffer 89 to glide slope indicator 75. To review briefly, it will be seen that the data transmission channel composed of decoder 63, ringing circuit 67 and threshold amplifier 69 and phase comparator 71 in conjunction with filter 73 is actually alternately handling three distinct types of data. The first type of data is the data reference bursts created by generator 14 for the localizer subdivisions indicating left or right movement in azimuth. These reference bursts from generator 14 consisting of six twin pulses actually sent at a repetition rate of 135 bursts per second. But the output of phase comparator 71 also is producing during the other part of the duty cycle, as illustrated in FIG. 7, information on the glide slope data. The reference bursts produced by generator 14' at the rate of 135 bursts per second are also sent through the channel 63, 67, 69, 71, and 73 during part of the duty cycle, when the localizer beacon is temporarily inactive due to the switching mechanism 25 and 25' in conjunction with timer 17. The glide slope date reference bursts are thus also being sent through the channel at the rate of 135 bursts per second. Thus, the channel 63, 67, 69, 71, 73 is actually handling 270 pulse bursts per second and it is actually being time shared to transmit these above two-mentioned types of data. As just discussed, the switching apparatus, such as switch 83, alternately connects the output of the comparator 71 to the localizer indicator 74 or the glide slope indicator 75 depending upon which part of the duty cycle is being used at the moment. Note also that the pulses which are actually occurring at the rate of 270 pulse bursts per second are taken from threshold amplifier 69 and introduced into rectifier 93. The purpose of this will be described immediately below. It may be noted that the use of the one data channel in the TACAN receiver 60 to transmit two distinct types of information is extremely economical of equipment. A separate channel comprising an additional ringing circuit, such as 67, and an additional threshold amplifier, such as 69, and another phase comparator, such as 71, could have been provided but there is no point in doing this because the time constants in this system and the bandwidth available in the equipment are sufficiently wide so that the channel can actually be time shared and two types of information multiplexed through the one set of equipment by switching the output as has been described.

In view of the above described operation of the system shown in FIG. 8 it is apparent that when the aircraft is at zero azimuth from the localizer beacon, or if 135 north reference signal is lost, localizer indicator 74 will not be energized and while it will appear to the pilot, when he observes this indicator, that he is at the proper localizer azimuth, it will not be apparent that the system is functioning. In order to indicate positively that the system is functioning, the localizer flag alarm indicator 76 is provided which is responsive to 150 cycle modulation signals appearing in the output of decoder 63. It is for this reason that 150 cycle modulations are imposed on the localizer carrier signal applied to localizer horn 24 of FIG. 6a. In FIG. 8, 150 cycle modulations appearing in the output of decoder 63 are detected by 150 cycle filter 90. The output of filter 90 is rectified by rectifier 91 and applied to "and" gate 92 which may be for example a diode gate. The output of 135 cycle threshold amplifier 69 is also applied to diode gate 92 via rectifier 93. Consequently, there will be an output from gate 92 only when both 135 cycle reference pulses and 150 cycle modulations are present at their respective output terminals.

When switch 84 is positioned at the terminal denoted L and there are both 135 reference pulses and 150 cycle modulations in the output of receiver 62, localizer flag alarm 76 will be energized and when switch 84 is positioned at the terminal denoted GS, glide slope flag alarm 77 will be energized. When energized, the flag alarms indicate the system is functioning properly and properly coded localizer or glide slope information is being received by the airborne equipment. When not energized on the other hand, the converse is indicated. Manually operated switches 76a and 77a may be interposed between switch 84 and the flag alarms and ganged with manually operated switch 80.

Figure 9:
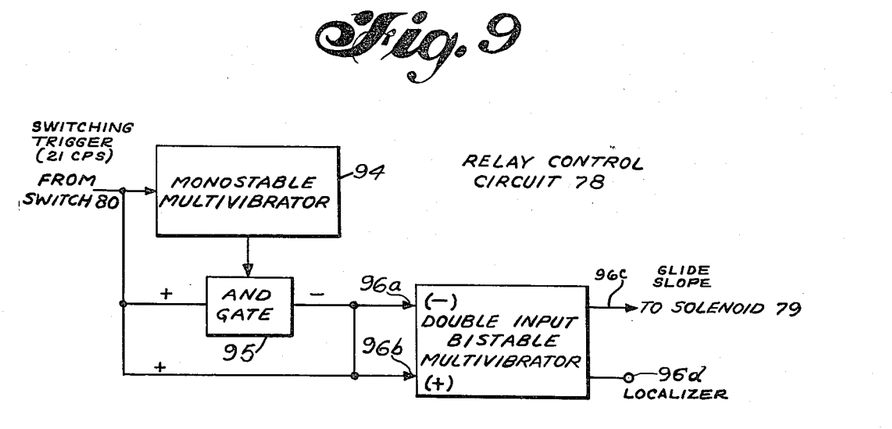
FIG. 9 shows one form of relay control such as might be employed in the modification equipment of FIG. 8.

Relay control circuit 78 distinguishes between the single 21 c.p.s. trigger announcing the localizer duty cycle and the pair of 21 c.p.s. triggers announcing the glide slope duty cycle. In FIG. 9 there is shown one form of such a control circuit comprising a monostable multivibrator 94 which produces an output, when triggered the output lasting for an interval greater than the interval between pairs of 21 c.p.s. triggers announcing the glide slope duty cycle and less than one duty cycle. FIGURES 7 and 10 both illustrate that one duty cycle is determined by the switching rate produced by timer 17, in this case, 21 cycles per second. In other words, one duty cycle lasts for ½₁ of a second. This period of one duty cycle is used part of the time for localizer data transmission and part of the time for glide slope data transmission as previously explained. Multivibrator 94 controls "and" gate 95 allowing pulses from switch 80 to pass when multivibrator 94 produces an output. In the process, gate 95 reverses the sign and amplifies pulses which pass through gate 95. The ouput from "and" gate 95 is applied to both inputs of double input bistable multivibrator 96 and pulses from switch 80 are also applied to both inputs of multivibrator 96. Inputs 96a responds only to negative pulses and inputs 96b responds only to positive pulses. Consequently, a negative pulse output from gate 95 will drive both inputs 96a and 96b negative and an output signal will be produced at 96c. Subsequently when positive pulses are applied to inputs 96a and 96b, an output signal will be produced at 96d. Obviously 96c will produce an output during the glide slope duty cycle and 96d will produce an output during the localizer duty cycle.

While there is described above a specific embodiment of this invention employing specially modified TACAN airborne equipment operating in conjunction with special localizer and glide slope beacons, it is to be understood that this description is made only by way of example and not as a limitation to the scope of the invention as set forth in the objects thereof and in the accompanying claims.

I claim:

1. An instrument landing system comprising a localizer beacon radiating adjacent lobes of a carrier frequency modulated at different phases, a glide slope beacon radiating modulated carrier frequency, said modulations varying with glide slope angle, means for generating a reference signal, receiver equipment responsive to said localizer and glide slope beacon radiation and to said reference signal, and comparison means coupled to the output of said receiver for comparing said reference signal to said localizer and glide slope beacon radiation producing signals for guiding an aircraft to a landing.

2. An instrument landing system comprising a localizer beacon radiating adjacent lobes of a carrier frequency modulated at opposite phases, a glide slope beacon radiating modulated carrier frequency, said glide slope beacon modulation varying with glide slope angle, means for generating a reference signal, receiver equipment responsive to said reference signal and alternately responsive to said localizer and glide slope beacon radiation, phase comparison means coupled to the output of said receiver for phase comparing beacon modulation with reference signal to produce landing guidance signals.

3. An instrument landing system comprising a localizer beacon radiating adjacent lobes of carrier frequency modulated at opposite phases by a given modulation frequency, a glide slope beacon radiating said carrier frequency and modulated by said modulating frequency whereby modulation phase varies with glide slope angle, means for alternately code pulsing radiation from each of said beacons so that only one of said beacons is code pulsed at a time, means for generating a reference signal, receiver equipment responsive to said carrier frequency, decoder means coupled to the output of said receiver equipment, means coupled to said decoder means for detecting localizer and glide slope beacon modulations and phase comparison means responsive to said detecting means and said reference signal for producing localizer and glide slope guidance signals.

4. An instrument landing system comprising a localizer beacon radiating adjacent lobes of carrier frequency modulated at opposite phases of a given modulating frequency, a glide slope beacon radiating said carrier frequency modulated at said modulating frequency, phase of said glide slope beacon modulation being a function of glide slope angle, means for alternately code pulsing radiation from each of said beacons so that only one beacon is code pulsed at a time, means for generating a reference signal, receiving equipment responsive to said carrier frequency, pulse decoder means coupled to the output of said receiver equipment, means coupled to said pulse decoder means for detecting localizer and glide slope beacon modulations and phase comparison means responsive to said detecting means and said reference signal for producing localizer and glide slope guidance signals.

5. An instrument landing system comprising a localizer beacon radiating adjacent lobes of carrier frequency modulated at opposite phases at a given modulating frequency, a glide slope beacon radiating said carrier frequency modulated at said modulating frequency, the phase of said modulation being a function of glide slope angle, means for alternately code pulsing radiation from each of said beacons so that radiation from only one beacon is code pulsed at a time, the repetition rate of said code pulses being regularly altered in one manner at a rate equal to said modulating frequency and regularly altered in another manner each time radiation from one of said beacons is code pulsed, airborne receiver equipment responsive to said carrier frequency, pulse decoding means coupled to the output of said receiver equipment, first detection means coupled to said decoder means for detecting said code pulse repeition rate altered in said one manner, second detection means coupled to said decoder means for detecting said code pulse repetition rate altered in said other manner, third detection means coupled to said receiver equipment for detecting carrier modulation frequency, phase comparing means responsive to the outputs of said first and third detection means, localizer and glide slope indicators, and switching means responsive to the output of said second detecting means for applying the output of said phase comparing means to said indicators.

6. An instrument landing system as in claim 5, and further including automatic gain control coupled to said receiver equipment and responsive to the output of said decoding means, means for separately storing the output of said automatic gain control when localizer beacon signals are decoded by said decoding means and when glide slope beacon signals are decoded by said decoding means and means under control of said switching means for applying said stored automatic gain control signal to said receiver.

7. An instrument landing system as in claim 6, and further including means for modulating said localizer beacon at a second modulating frequency, a fourth detection means coupled to the output of said decoding means for detecting said second modulating signal in that output, gating means coupled to the output of said first and fourth detection means, localizer and glide slope alarm indicator and means responsive to said switching means for coupling the output of said gating means to said alarm indicators.

8. An instrument landing system as in claim 7, and further including integrating circuits coupled to the inputs to said localizer and glide slope indicators.

References Cited in the file of this patent
UNITED STATES PATENTS 2,815,507    De Faymoreau ___________ Dec. 3, 1957